US012610360B2

(12) United States Patent
Zhao

(10) Patent No.: US 12,610,360 B2
(45) Date of Patent: Apr. 21, 2026

(54) SCHEDULING METHOD, DEVICE, EQUIPMENT AND READABLE STORAGE MEDIUM

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 568 days.

(21) Appl. No.: 18/004,035

(22) PCT Filed: Jun. 23, 2021

(86) PCT No.: PCT/CN2021/101755
§ 371 (c)(1),
(2) Date: Dec. 30, 2022

(87) PCT Pub. No.: WO2022/001770
PCT Pub. Date: Jan. 6, 2022

(65) Prior Publication Data
US 2023/0262681 A1      Aug. 17, 2023

(30) Foreign Application Priority Data

Jun. 30, 2020   (CN) .......................... 202010630501.3

(51) Int. Cl.
| | |
|---|---|
| *H04W 72/1263* | (2023.01) |
| *H04W 28/02* | (2009.01) |
| *H04W 72/12* | (2023.01) |
| *H04W 72/231* | (2023.01) |
| *H04W 84/06* | (2009.01) |

(52) U.S. Cl.
CPC ... *H04W 72/1263* (2013.01); *H04W 72/1215* (2013.01); *H04W 72/231* (2023.01); *H04W 28/0278* (2013.01); *H04W 84/06* (2013.01)

(58) Field of Classification Search
CPC ......... H04W 72/1263; H04W 72/1215; H04W 72/20
See application file for complete search history.

(56) References Cited

U.S. PATENT DOCUMENTS

| | | | | |
|---|---|---|---|---|
| 6,108,539 A | * | 8/2000 | Ray .................... | H04B 7/18506 |
| | | | | 455/430 |
| 10,448,375 B2 | * | 10/2019 | Suzuki ............. | H04W 74/0833 |

(Continued)

FOREIGN PATENT DOCUMENTS

| | | | | |
|---|---|---|---|---|
| CN | 107079530 A | * | 8/2017 | ............ H04W 72/00 |
| CN | 107509203 A | | 12/2017 | |

(Continued)

OTHER PUBLICATIONS

International Search Report for PCT Application No. PCT/CN2021/101755 , issued on Sep. 15, 2021 and its English Translation provided by WIPO.

(Continued)

*Primary Examiner* — Wutchung Chu
*Assistant Examiner* — Berhanu D Belete
(74) *Attorney, Agent, or Firm* — Ladas & Parry, LLP

(57) ABSTRACT
A scheduling method, a scheduling device and a readable storage medium are provided, related to the communication technologies. The method includes: in a case that the terminal simultaneously aggregates a non-terrestrial cell and a terrestrial cell, using the terrestrial cell to assist a scheduling of the non-terrestrial cell.

13 Claims, 3 Drawing Sheets

(56) References Cited

U.S. PATENT DOCUMENTS

| | | | | |
|---|---|---|---|---|
| 2002/0013150 A1* | 1/2002 | McKenna | ................ | H01Q 1/28 |
| | | | | 455/430 |
| 2008/0102813 A1* | 5/2008 | Chari | .................... | H01Q 1/283 |
| | | | | 455/424 |
| 2017/0142575 A1* | 5/2017 | Quan | ...................... | H04W 8/24 |
| 2017/0257876 A1* | 9/2017 | Loehr | ................... | H04L 5/0044 |
| 2017/0272131 A1* | 9/2017 | Ananth | ................ | H04B 7/0413 |
| 2018/0227938 A1* | 8/2018 | Lee | ....................... | H04L 5/0053 |
| 2019/0239082 A1* | 8/2019 | Ravishankar | ...... | H04B 7/18528 |
| 2021/0021333 A1* | 1/2021 | Kusashima | ......... | H04W 52/242 |
| 2021/0194571 A1* | 6/2021 | Ma | ..................... | H04B 7/18504 |
| 2022/0007455 A1* | 1/2022 | Hong | ................... | H04L 1/1883 |

FOREIGN PATENT DOCUMENTS

| | | | | |
|---|---|---|---|---|
| CN | 111245503 A * | 6/2020 | ............. | Y02D 30/70 |
| KR | 102882255 B1 * | 11/2025 | ........ | H04W 36/0061 |
| WO | WO-9922465 A1 * | 5/1999 | ......... | H04B 7/18506 |
| WO | WO-2020030713 A2 * | 2/2020 | ........ | H04W 36/0088 |
| WO | 2020123434 A1 | 6/2020 | | |
| WO | WO-2020169314 A1 * | 8/2020 | ............ | H04W 72/21 |

OTHER PUBLICATIONS

Written Opinion for PCT Application PCT/CN2021/101755, issued on Sep. 15, 2021, and its English Translation provided by WIPO.
International Preliminary Report on Patentability for PCT Application PCT/CN2021/101755, issued on Dec. 13, 2022, and its English Translation provided by WIPO.
"Discussion on UL scheduling enhancement in NTN", Agenda Item: 6.6.3.1, 3GPP TSG-RAN WG2 Meeting #107, R2-1913337, Chongqing, China, Oct. 14-Oct. 18, 2019, Source: OPPO, Document for: Discussion, all pages.
Extended European Search Report for European Patent Application No. 21834641.9 issued by the European Patent Office on Oct. 23, 2023.

* cited by examiner

SCHEDULING METHOD, DEVICE, EQUIPMENT AND READABLE STORAGE MEDIUM

CROSS REFERENCE OF RELATED APPLICATION

The present application is the U.S. national phase of PCT Application PCT/CN2021/101755 filed on Jun. 23, 2021, which claims a priority to Chinese patent application Ser. No. 202010630501.3 filed on Jun. 30, 2020, the disclosures of which are incorporated herein by reference in their entireties.

TECHNICAL FIELD

The present disclosure relates to the field of communications technologies, and in particular, to a scheduling method, device, device, and readable storage medium.

BACKGROUND

A 3GPP (3rd Generation Partnership Project) wireless communication system is a system based on scheduling, in which a base station allocates time-frequency resources required for data transmission to a terminal, and the terminal receives downlink data or transmits uplink data according to a scheduling command of the base station.

For uplink, dynamic scheduling or preconfigured grant may be used.

(1) dynamic scheduling: for dynamic Scheduling, the specific Scheduling process generally includes Scheduling Request (SR)>Buffer Status Reporting (BSR)>UL grant (uplink Scheduling grant, that is, uplink resources allocated by the base station to the terminal).

(2) preconfigured grant: compared with dynamic scheduling, the preconfigured grant is mainly used for saving the overhead of scheduling signaling, namely, resources are allocated once and are periodically effective. In order to make the uplink preconfigured grant and the terminal uplink service characteristics more matched, a terminal assistance information reporting process is also introduced, and the characteristics of the terminal service, such as the period, the data packet size and other information, are reported. The network can more reasonably carry out configuration with configuration grant according to the assistance information reported by the terminal.

A fourth Generation (4-th Generation, 4G)/fifth Generation (5th Generation, 5G) system may support dual connectivity, i.e., one terminal may access two different base stations, one being a primary base station and one being a secondary base station. The Cell under the Master base station is called a Master Cell Group (MCG), and the Cell under the Secondary base station is called a Secondary Cell Group (SCG). The MCG and the SCG correspond to different Medium Access Control (MAC) entities, no matter on the network side or the terminal side. Scheduling related configuration information (such as SR/BSR related Logical Channel Identification (LCID), Logical Channel Group (LCG) Identification (Identification, ID) configuration, etc.) under the MCG and the SCG is maintained based on the MAC entity. That is, the LCID and the LCG ID corresponding to two different logical channels under the MCG and the SCG may be identical.

The air-ground integrated communication is a development direction of a future mobile communication system.

When the network is integrated, the non-terrestrial cell and the terrestrial cell have a large difference between the time delay and other mechanisms, and generally, the non-terrestrial cell and the terrestrial cell correspond to different MAC entities. If the design principle of the previous mobile communication system is used, that is, each MAC entity independently performs scheduling of the logical channel corresponding to the MAC entity, the scheduling delay of the non-terrestrial cell may be very large.

SUMMARY

The embodiment of the disclosure provides a scheduling method, a scheduling device and a readable storage medium, so as to reduce scheduling delay of a non-terrestrial cell.

In a first aspect of the embodiment of the present disclosure, a scheduling method is provided, applied to a terminal and including:

in a case that the terminal simultaneously aggregates a non-terrestrial cell and a terrestrial cell, using the terrestrial cell to assist a scheduling of the non-terrestrial cell.

Optionally, for a Scheduling Request (SR), the using the terrestrial cell to assist the scheduling of the non-terrestrial cell includes:

transmitting an SR of the non-terrestrial cell through a SR resource configured by the terrestrial cell.

Optionally, when transmitting the SR of the non-terrestrial cell through the SR resource configured by the terrestrial cell, the SR of the non-terrestrial cell is identified by any one of:

receiving SR resource configuration information configured by the terrestrial cell by a network device, where SR resources configured for the terrestrial cell and the non-terrestrial cell in the SR resource configuration information are distinguished by a time domain and/or a frequency domain, and the SR resource corresponding to the non-terrestrial cell is selected from the SR resource configured for the terrestrial cell according to the SR resource configuration information to send the SR of the non-terrestrial cell; and carrying first indication information in the SR, where the first indication information is configured to indicate whether the SR is the SR of the terrestrial cell or the SR of the non-terrestrial cell.

Optionally, the first indication information includes at least one of:

cell group identification information;
cell type identification information; and
cell identification information.

Optionally, for a Buffer Status Reporting (BSR) process, the terrestrial cell is used to assist scheduling of the non-terrestrial cell by any one of:

transmitting the BSR by using the same BSR media access control element (MAC CE), where the indication information carried by the BSR MAC CE is configured to distinguish whether the BS contained in the BSR MAC CE is the BS aiming at the terrestrial cell or the BS aiming at the non-terrestrial cell;

transmitting respectively the BS of the terrestrial cell and the BS of the non-terrestrial cell by using different BSR MAC CEs.

Optionally, the indication information includes any one of:

a logical channel group identification (LCG ID);
cell type indication information.

Optionally, when the indication information includes the LCG ID, the indication information carried by the BSR MAC CE is configured to distinguish whether the BS contained in the BSR MAC CE is the BS aiming at the terrestrial cell or the BS aiming at the non-terrestrial cell by any one of:

value ranges of the logical channel group identification corresponding to the non-terrestrial cell and the logical channel group identification corresponding to the terrestrial cell are different;

whether the BS contained in the BSR MAC CE is the BS aiming at the terrestrial cell or the BS aiming at the non-terrestrial cell is distinguished by using a sequence of the logical channel group in the BSR MAC CE, where the sequence of the logical channel group identifications corresponding to the non-terrestrial cell and the terrestrial cell in the BSR MAC CE is fixed, agreed by a protocol or configured by a network device.

Optionally, when the indication information includes the cell type indication information, the indication information carried by the BSR MAC CE is configured to distinguish whether the BS contained in the BSR MAC CE is the BS aiming at the terrestrial cell or the BS aiming at the non-terrestrial cell by any one of:

adding 1 bit of cell type indication information before each logical channel group identification contained in the BSR MAC CE;

adding bit mapping indication information to a payload of the BSR MAC CE, where the bit mapping indication information is configured to indicate each logical channel group identification and/or a cell type corresponding to the BS in the BSR MAC CE.

Optionally, the transmitting respectively the BS of the terrestrial cell and the BS of the non-terrestrial cell by using different BSR MAC CEs includes:

an MAC subheader corresponding to the BSR MAC CE of the terrestrial cell and an MAC subheader corresponding to the BSR MAC CE of the non-terrestrial cell using different LCIDs; or adding indication information in an MAC subheader corresponding to the BSR MAC CE or in the BSR MAC CE, where the indication information is configured to indicate that the BSR MAC CE corresponds to whether the terrestrial cell or the non-terrestrial cell; or the LCG ID identifications used by the non-terrestrial cell and the terrestrial cell being in different value ranges.

Optionally, for a reporting process of preconfigured grant assistance information, the using the terrestrial cell to assist the scheduling of the non-terrestrial cell includes:

reporting the preconfigured grant assistance information of the non-terrestrial cell through the terrestrial cell, where the preconfigured grant assistance information carries indication information, and the indication information is configured to determine that the assistance information is for the non-terrestrial cell.

Optionally, the indication information includes at least one of:

cell group identification information corresponding to the preconfigured grant assistance information;

cell type identification information corresponding to the preconfigured grant assistance information; and logical channel identification information corresponding to the preconfigured grant assistance information.

Optionally, the using the terrestrial cell to assist the scheduling of the non-terrestrial cell includes:

receiving uplink scheduling information and/or downlink scheduling information transmitted by a network device for the non-terrestrial cell, where the uplink scheduling information and/or the downlink scheduling information are transmitted by the network device through the terrestrial cell.

Optionally, the uplink scheduling information and/or downlink scheduling information includes at least one of:

cell group identification information;

cell type identification information;

cell identification information.

In a second aspect of the present disclosure, a scheduling method is provided, applied to network device and including:

in a case that a terminal simultaneously aggregates a non-terrestrial cell and a terrestrial cell, using the terrestrial cell to assist a scheduling of the non-terrestrial cell.

Optionally, in a case that a Scheduling Request (SR) or a Buffer Status Reporting (BSR) or preconfigured grant assistance information of the terminal is received, the using the terrestrial cell to assist the scheduling of the non-terrestrial cell includes:

allocating an uplink resource of the non-terrestrial cell to the terminal, according to the SR or the BSR or the preconfigured grant assistance information;

transmitting uplink scheduling information to the terminal according to an allocation result of the uplink resource.

Optionally, the allocating the uplink resource of the non-terrestrial cell to the terminal according to the SR or the BSR or the preconfigured grant assistance information includes:

in a case that the terrestrial cell and the non-terrestrial cell correspond to a same network device, allocating directly the uplink resource of the non-terrestrial cell to the terminal according to the SR or the BSR or the preconfigured grant assistance information.

Optionally, in the case that the terrestrial cell corresponds to a first network device and the non-terrestrial cell corresponds to a second network device, the network device is the first network device;

the allocating the uplink resource of the non-terrestrial cell to the terminal according to the SR or the BSR or the preconfigured grant assistance information includes any one of:

transmitting third indication information to the second network device, where the third indication information is configured to indicate the second network device to allocate an uplink resource for the non-terrestrial cell to the terminal; and acquiring a reserved resource from the second network device, and allocating an uplink resource of the non-terrestrial cell to the terminal from the reserved resource according to the SR or the BSR or the preconfigured grant assistance information.

Optionally, in the case that the terrestrial cell corresponds to a first network device and the non-terrestrial cell corresponds to a second network device, the network device is the second network device;

the allocating the uplink resource of the non-terrestrial cell to the terminal according to the SR or the BSR or the preconfigured grant assistance information includes any one of:

receiving third indication information transmitted by the first network device, and allocating the uplink resource of the non-terrestrial cell to the terminal according to the third indication information;

transmitting a reserved resource to the first network device.

Optionally, the third indication information includes at least one of:

logical channel indication information corresponding to the SR;

an SR configuration identification;

a logical channel group identification and a logical channel group buffer status information of the non-terrestrial cell;

a BSR MAC CE of the non-terrestrial cell; and preconfigured grant assistance information corresponding to the non-terrestrial cell.

Optionally, in the case that the terrestrial cell corresponds to the first network device and the non-terrestrial cell corresponds to the second network device, the transmitting the uplink scheduling information to the terminal according to the allocation result of the uplink resource includes:

the second network device transmitting uplink scheduling information of the non-terrestrial cell to the terminal; or the second network device transmitting uplink scheduling information of the non-terrestrial cell to the first network device, and the first network device transmitting the uplink scheduling information of the non-terrestrial cell to the terminal through the terrestrial cell.

Optionally, in the case that the first network device transmits the uplink scheduling information of the non-terrestrial cell to the terminal through the terrestrial cell, the uplink scheduling information includes at least one of:

cell group identification information;

cell type identification information;

cell identification information.

Optionally, in the case that the terrestrial cell corresponds to a first network device and the non-terrestrial cell corresponds to a second network device, the network device is the first network device;

for a downlink scheduling, the using the terrestrial cell to assist the scheduling of the non-terrestrial cell includes:

receiving downlink scheduling information of the non-terrestrial cell and a cell identification or a carrier identification of the non-terrestrial cell which are transmitted by the second network device;

transmitting downlink scheduling information of the non-terrestrial cell to the terminal through the terrestrial cell.

Optionally, in the case that the terrestrial cell corresponds to a first network device and the non-terrestrial cell corresponds to a second network device, the network device is the second network device;

for a downlink scheduling, the using the terrestrial cell to assist the scheduling of the non-terrestrial cell includes:

transmitting downlink scheduling information of the non-terrestrial cell and a cell identification or a carrier identification of the non-terrestrial cell to the first network device.

Optionally, the downlink scheduling information includes at least one of:

cell group identification information;

cell type identification information;

cell identification information.

In a third aspect of the embodiment of the present disclosure, a scheduling device is provided, applied to a terminal or a network device and including:

a processing module, configured to, in a case that the terminal simultaneously aggregates a non-terrestrial cell and a terrestrial cell, use the terrestrial cell to assist a scheduling of the non-terrestrial cell.

In a fourth aspect of the embodiment of the present disclosure, a communication device is provided, applied to a terminal and including: a transceiver, a memory, a processor, and a program stored on the memory and executable on the processor; where the processor is configured to read the program in the memory to perform:

in a case that the terminal simultaneously aggregates a non-terrestrial cell and a terrestrial cell, using the terrestrial cell to assist a scheduling of the non-terrestrial cell Optionally, the processor is further configured to read the program in the memory to perform:

for a Scheduling Request (SR), transmitting an SR of the non-terrestrial cell through a SR resource configured by the terrestrial cell.

Optionally, the processor is further configured to read the program in the memory to perform:

when transmitting the SR of the non-terrestrial cell through the SR resource configured by the terrestrial cell, identifying the SR of the non-terrestrial cell by any one of:

receiving SR resource configuration information configured by the terrestrial cell by a network device, where SR resources configured for the terrestrial cell and the non-terrestrial cell in the SR resource configuration information are distinguished by a time domain and/or a frequency domain, and the SR resource corresponding to the non-terrestrial cell is selected from the SR resource configured for the terrestrial cell according to the SR resource configuration information to send the SR of the non-terrestrial cell; and carrying first indication information in the SR, where the first indication information is configured to indicate whether the SR is the SR of the terrestrial cell or the SR of the non-terrestrial cell.

Optionally, the processor is further configured to read the program in the memory to perform:

for a Buffer Status Reporting (BSR) process, using the terrestrial cell to assist scheduling of the non-terrestrial cell by any one of:

transmitting the BSR by using the same BSR media access control control element (MAC CE), where the indication information carried by the BSR MAC CE is configured to distinguish whether the BS contained in the BSR MAC CE is the BS aiming at the terrestrial cell or the BS aiming at the non-terrestrial cell;

transmitting respectively the BS of the terrestrial cell and the BS of the non-terrestrial cell by using different BSR MAC CEs.

Optionally, for a reporting process of preconfigured grant assistance information, the processor is further configured to read the program in the memory to perform:

reporting the preconfigured grant assistance information of the non-terrestrial cell through the terrestrial cell, where the preconfigured grant assistance information carries indication information, and the indication information is configured to determine that the assistance information is for the non-terrestrial cell.

Optionally, the processor is further configured to read the program in the memory to perform:

receiving uplink scheduling information and/or downlink scheduling information transmitted by a network device for the non-terrestrial cell, where the uplink scheduling information and/or the downlink scheduling information are transmitted by the network device through the terrestrial cell.

In a fifth aspect of the embodiment of the present disclosure, a communication device is provided, applied to a network device and including: a transceiver, a memory, a processor, and a program stored on the memory and executable on the processor; where the processor is configured to read the program in the memory to perform:

in a case that a terminal simultaneously aggregates a non-terrestrial cell and a terrestrial cell, using the terrestrial cell to assist a scheduling of the non-terrestrial cell.

Optionally, the processor is configured to read the program in the memory to perform:

in a case that a Scheduling Request (SR) or a Buffer Status Reporting (BSR) or preconfigured grant assistance information of the terminal is received, allocating an uplink resource of the non-terrestrial cell to the terminal, according to the SR or the BSR or the preconfigured grant assistance information;

transmitting uplink scheduling information to the terminal according to an allocation result of the uplink resource.

Optionally, the processor is further configured to read the program in the memory to perform:

in a case that the terrestrial cell and the non-terrestrial cell correspond to a same network device, allocating directly the uplink resource of the non-terrestrial cell to the terminal according to the SR or the BSR or the preconfigured grant assistance information.

Optionally, in the case that the terrestrial cell corresponds to a first network device and the non-terrestrial cell corresponds to a second network device, the network device is the first network device;

the processor is further configured to read the program in the memory to perform any one of:

transmitting third indication information to the second network device, where the third indication information is configured to indicate the second network device to allocate an uplink resource for the non-terrestrial cell to the terminal; and acquiring a reserved resource from the second network device, and allocating an uplink resource of the non-terrestrial cell to the terminal from the reserved resource according to the SR or the BSR or the preconfigured grant assistance information.

Optionally, in the case that the terrestrial cell corresponds to a first network device and the non-terrestrial cell corresponds to a second network device, the network device is the second network device;

the processor is further configured to read the program in the memory to perform any one of:

receiving third indication information transmitted by the first network device, and allocating the uplink resource of the non-terrestrial cell to the terminal according to the third indication information;

transmitting a reserved resource to the first network device.

Optionally, in the case that the terrestrial cell corresponds to the first network device and the non-terrestrial cell corresponds to the second network device, the processor is further configured to read the program in the memory to perform:

transmitting uplink scheduling information of the non-terrestrial cell to the terminal; or transmitting uplink scheduling information of the non-terrestrial cell to the first network device, and the first network device transmitting the uplink scheduling information of the non-terrestrial cell to the terminal through the terrestrial cell.

Optionally, in the case that the terrestrial cell corresponds to a first network device and the non-terrestrial cell corresponds to a second network device, the network device is the first network device;

the processor is further configured to read the program in the memory to perform:

for a downlink scheduling, receiving downlink scheduling information of the non-terrestrial cell and a cell identification or a carrier identification of the non-terrestrial cell which are transmitted by the second network device;

transmitting downlink scheduling information of the non-terrestrial cell to the terminal through the terrestrial cell.

Optionally, in the case that the terrestrial cell corresponds to a first network device and the non-terrestrial cell corresponds to a second network device, the network device is the second network device;

the processor is further configured to read the program in the memory to perform:

for a downlink scheduling, transmitting downlink scheduling information of the non-terrestrial cell and a cell identification or a carrier identification of the non-terrestrial cell to the first network device.

In a sixth aspect of the embodiment of the present disclosure, a readable storage medium is provided, storing a program, wherein the program is executed by a processor to perform the scheduling method in the first aspect.

According to the embodiment of the disclosure, when a terminal aggregates a non-terrestrial cell and a terrestrial cell at the same time, the terrestrial cell is used to assist scheduling of the non-terrestrial cell. Therefore, the scheduling delay of the non-terrestrial cell can be reduced.

BRIEF DESCRIPTION OF THE DRAWINGS

In order to more clearly illustrate the technical solutions of the embodiments of the present disclosure, the drawings required to be used in the description of the embodiments of the present disclosure will be briefly introduced below, and it is apparent that the drawings in the following description are only some embodiments of the present disclosure, and it is obvious for those skilled in the art that other drawings may be obtained according to the drawings without inventive labor.

DETAILED DESCRIPTION

The embodiments of the present disclosure will be described clearly and completely with reference to the accompanying drawings in the embodiments of the present disclosure, and it is to be understood that the described embodiments are only some embodiments, but not all embodiments, of the present disclosure. All other embodiments, which can be derived by a person skilled in the art from the embodiments disclosed herein without inventive step, are intended to be within the scope of the present disclosure.

Figure 1:
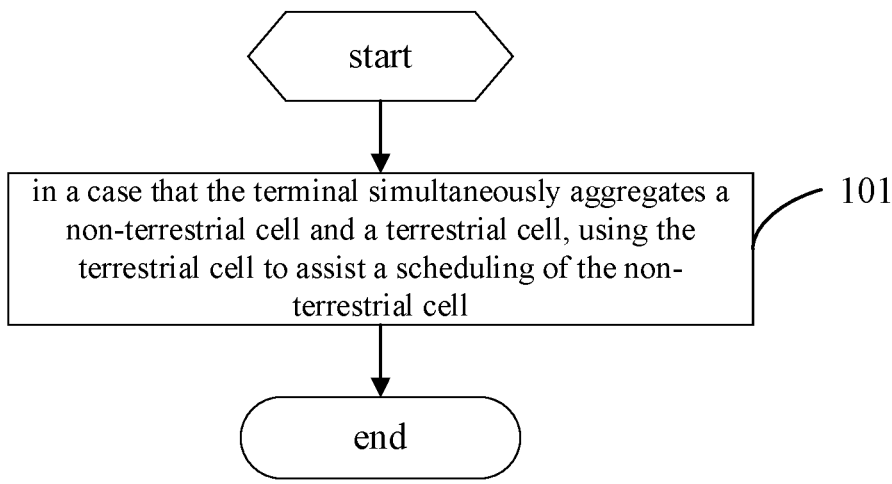
FIG. 1 is a flowchart of a scheduling method in an embodiment of the present disclosure.

Referring to FIG. 1, FIG. 1 is a flowchart of a scheduling method in an embodiment of the present disclosure, and as shown in FIG. 1, includes:

Step 101: in a case that the terminal simultaneously aggregates a non-terrestrial cell and a terrestrial cell, using the terrestrial cell to assist a scheduling of the non-terrestrial cell.

In the embodiment of the present disclosure, the meaning of "the terminal aggregates the non-terrestrial cell and the terrestrial cell at the same time" means that the non-terrestrial cell and the terrestrial cell serve the terminal at the same time.

In the embodiment of the disclosure, the method can be applied to the terminal. The terminal has different processing modes for uplink and downlink scheduling.

Processing manner 1: up dynamic scheduling

1. SR process: specifically, in this process, the terminal transmits the SR of the non-terrestrial cell by using the SR resource configured for the terrestrial cell. It can also be understood that in this process, the SR resource is configured forly in the terrestrial cell, and if there is an SR to be transmitted in the non-terrestrial cell, the SR resource configured in the terrestrial cell is used for transmission.

When the SR of the non-terrestrial cell is transmitted through the SR resource configured for the terrestrial cell, identifying the SR of the non-terrestrial cell by any one of the following modes, including:

(1) receiving SR resource configuration information configured for the terrestrial cell by network device, where the SR resource configuration information is distinguished from the time domain and/or the frequency domain aiming at the SR resources configured for the terrestrial cell and the non-terrestrial cell, and selecting the SR resource corresponding to the non-terrestrial cell from the SR resources configured for the terrestrial cell according to the SR resource configuration information to send the SR of the non-terrestrial cell.

In this manner, the network device distinguishes the SR resources for the non-terrestrial cell and the terrestrial cell from the time domain and/or the frequency domain when configuring the SR resources for the terminal. Then, when the SR of the non-terrestrial cell is transmitted, according to the configuration of the network device, the SR resource corresponding to the non-terrestrial cell is selected from the SR resources configured for the terrestrial cell to transmit the SR of the non-terrestrial cell.

(2) carrying first indication information in the SR, where the first indication information is configured to indicate whether the SR is the SR of the terrestrial cell or the SR of the non-terrestrial cell.

the first indication information includes at least one of:

cell Group (CG) identification information: for example, if the CGs corresponding to the non-terrestrial Cell and the terrestrial cell are different, for example, the non-terrestrial Cell corresponds to an SCG, and the terrestrial cell corresponds to an MCG, 1 bit may be configured to indicate whether the SR corresponds to an MCG or an SCG, or the Cell group numbers corresponding to the non-terrestrial Cell and the terrestrial cell are different, more bits may be configured to indicate the Cell group number corresponding to the SR, or bit mapping may be configured to indicate that the SR corresponds to an SR triggered by those Cell groups;

cell type identification information: for example, 1 bit indicates a non-terrestrial cell or a terrestrial cell.

Cell identification information.

2. BSR process:

in this process, the terrestrial cell is used to assist in the scheduling of the non-terrestrial cell by either:

(1) transmitting BSR by using the same BSR MAC CE, where the BSs contained in the BSR MAC CE are distinguished to be the BSs aiming at the terrestrial cell or the BSs aiming at the non-terrestrial cell through indication information carried by the BSR MAC CE.

the indication information includes any one of:

LCG ID; cell type indication information.

If the indication information includes a logical channel group identification, in this manner, it may be distinguished by the indication information carried by the BSR MAC CE that the BS included in the BSR MAC CE is a BS for the terrestrial cell or a BS for the non-terrestrial cell by using one of:

(A) the value ranges of the logical channel group identification corresponding to the non-terrestrial cell and the logical channel group identification corresponding to the terrestrial cell are different.

(B) distinguishing by using the sequence of the logical channel group in the BSR MAC CE, where the sequence of the logical channel group identifications corresponding to the non-terrestrial cell and the terrestrial cell in the BSR MAC CE is fixed, agreed by a protocol or configured by network device.

If the indication information includes cell type indication information, in this manner, it may be distinguished by the indication information carried by the BSR MAC CE that the BS included in the BSR MAC CE is a BS for the terrestrial cell or a BS for the non-terrestrial cell by using one of:

(A) adding 1 bit of cell type indication information before each logical channel group identification contained in the BSR MAC CE;

(B) adding bit mapping indication information to the payload of the BSR MAC CE, where the bit mapping indication information is configured to indicate each logical channel group identification and/or a cell type corresponding to the BS in the BSR MAC CE.

(2) Transmitting respectively the BS of the terrestrial cell and the BS of the non-terrestrial cell by using different BSR MAC CEs.

Specifically, in this manner, the BS of the terrestrial cell and the BS of the non-terrestrial cell can be distinguished in any one of the following manners:

(A) the MAC subheader corresponding to the BSR MAC CE of the terrestrial cell and the MAC subheader corresponding to the BSR MAC CE of the non-terrestrial cell use different LCIDs;

(B) adding indication information in an MAC subheader corresponding to the BSR MAC CE or in the BSR MAC CE, where the indication information is configured to indicate that the BSR MAC CE corresponds to a terrestrial cell or a non-terrestrial cell;

(C) and the LCG ID identifications used by the non-terrestrial cell and the terrestrial cell have different value ranges.

3. The reporting process of the preconfigured grant assistance information includes:

in this process, the terminal reports preconfigured grant assistance information of the non-terrestrial cell through the terrestrial cell, where the preconfigured grant assistance information carries indication information, and the indication information is used to determine that the assistance information is for the non-terrestrial cell.

The indication information includes at least one of:

cell group identification information corresponding to the preconfigured grant assistance information: for example, if the CGs corresponding to the non-terrestrial Cell and the terrestrial cell are different, for example, the non-terrestrial Cell corresponds to an SCG, and the terrestrial cell corresponds to an MCG, 1 bit may be configured to indicate whether the SR corresponds to an MCG or an SCG, or the Cell group numbers corresponding to the non-terrestrial Cell and the terrestrial cell are different, more bits may be configured to indicate the Cell group number corresponding to the SR, or bit mapping may be configured to indicate that the SR corresponds to an SR triggered by those Cell groups;

the cell type identification information corresponding to the preconfigured grant assistance information: for example, 1 bit is configured to indicate whether the non-terrestrial cell or the terrestrial cell;

the logical channel identification information corresponding to the preconfigured grant assistance information.

According to the above description, in the process of using the terrestrial cell to assist the scheduling of the non-terrestrial cell, the information of the terrestrial cell and the information of the non-terrestrial cell are distinguished in different ways, so that the purpose of using the terrestrial cell to assist the scheduling of the non-terrestrial cell can be achieved, and the purpose of reducing the scheduling delay of the non-terrestrial cell can be achieved.

Processing manner 2: uplink/downlink scheduling the terminal receives uplink scheduling information and/ or downlink scheduling information which is transmitted by the network device and aims at the non-terrestrial cell, where the uplink scheduling information and/or the downlink scheduling information are transmitted by the network device through the terrestrial cell.

the uplink scheduling information and/or the downlink scheduling information includes at least one of:

cell group identification information;

cell type identification information;

cell identification information.

In the embodiment of the disclosure, when a terminal aggregates a non-terrestrial cell and a terrestrial cell at the same time, the terrestrial cell is used to assist scheduling of the non-terrestrial cell. Therefore, the scheduling delay of the non-terrestrial cell can be reduced by using the scheme of the embodiment of the disclosure.

Referring to FIG. 1 again, the scheduling method of the embodiment of the present disclosure may also be applied to a network device. Under the condition that the terminal simultaneously aggregates the non-terrestrial cell and the terrestrial cell, the network device utilizes the terrestrial cell to assist the scheduling of the non-terrestrial cell.

In practical application, the network device has different processing modes for uplink and downlink scheduling.

1. For the uplink resource allocation process (including dynamic scheduling and preconfigured grant), the network device may allocate, to the terminal, the uplink resource of the non-terrestrial cell according to the SR or the BSR or the preconfigured grant assistance information, and then send uplink scheduling information to the terminal according to an allocation result of the uplink resource, in a case where the SR or the BSR or the preconfigured grant assistance information of the terminal is received.

In practical applications, the terrestrial cell and the non-terrestrial cell may correspond to the same network device, or may correspond to different network devices. If the network devices correspond to the same network device, the uplink resource allocation process may be handled by the network device. If the uplink resource assignment process corresponds to a different network device, the uplink resource assignment process may be handled by the different network device. For convenience of description, if the network device corresponds to different network devices, the network device corresponding to the terrestrial cell is referred to as a first network device, and the network device corresponding to the non-terrestrial cell is referred to as a second network device.

In a case that the terrestrial cell and the non-terrestrial cell correspond to the same network device, the network device directly allocates uplink resources of the non-terrestrial cell to the terminal according to the SR or the BSR or the preconfigured grant assistance information.

In a case that the terrestrial cell and the non-terrestrial cell correspond to different network device, the first network device and the second network device have different processing modes.

For a first network device, allocating uplink resources of the non-terrestrial cell to the terminal according to the SR or the BSR or the preconfigured grant assistance information by any one of the following manners:

(1) transmitting third indication information to the second network device, where the third indication information is configured to indicate the second network device to allocate uplink resources of the non-terrestrial cell to the terminal.

That is, if the terrestrial cell and the non-terrestrial cell correspond to different network devices, the first network device may send third indication information to the second network device through an inter-device interface, for example, an X2 or an Xn interface, or an interface between other network devices defined in a subsequent version, and the second network device allocates uplink resources of the non-terrestrial cell to the terminal based on the third indication information.

(2) And acquiring reserved resources from the second network device, and allocating uplink resources of the non-terrestrial cell for the terminal from the reserved resources according to the SR or the BSR or the preconfigured grant assistance information.

That is, if the terrestrial cell and the non-terrestrial cell correspond to different network devices, the second network device may reserve a resource and send the reserved resource to the first network device through the inter-device interface. After receiving the SR/BSR/preconfigured grant assistance information aiming at the non-terrestrial cell transmitted by the terminal, the first network device directly allocates the uplink resource of the non-terrestrial cell for the terminal from the reserved resource.

For a second network device, allocating uplink resources of the non-terrestrial cell to the terminal according to the SR or the BSR or the preconfigured grant assistance information by any one of the following manners:

(1) receiving third indication information transmitted by the first network device, and allocating uplink resources of the non-terrestrial cell to the terminal according to the third indication information;

(2) transmitting the reserved resources to the first network device.

the third indication information includes at least one of:

logical channel indication information corresponding to the SR;

an SR configuration identification;

the logical channel group identification and the logical new channel group buffer status information of the non-terrestrial cell;

a BSR MAC CE for the non-terrestrial cell;

the preconfigured grant assistance information corresponding to the non-terrestrial cell.

In this disclosure, in a process of transmitting uplink scheduling information to the terminal according to the allocation result of the uplink resource, the second network device sends the uplink scheduling information of the non-terrestrial cell to the terminal; or, the second network device sends the uplink scheduling information of the non-terrestrial cell to the first network device, and the first network device sends the uplink scheduling information of the non-terrestrial cell to the terminal through the terrestrial cell.

If the first network device sends uplink scheduling information of the non-terrestrial cell to the terminal through the terrestrial cell, the uplink scheduling information includes at least one of the following items:

cell group identification (Cell group) information: for example, 1 bit is configured to indicate MCG or SCG, or more bits are configured to indicate the number or bit mapping of a specific Cell group;

cell type identification information: for example, 1 bit is configured to indicate whether the non-terrestrial cell or the terrestrial cell;

cell identification information.

2. For the downlink scheduling process, if the terrestrial cell and the non-terrestrial cell correspond to different network devices, the first network device receives downlink scheduling information of the non-terrestrial cell and a cell identification or a carrier identification of the non-terrestrial cell, which are transmitted by the second network device, and sends the downlink scheduling information of the non-terrestrial cell to the terminal through the terrestrial cell. Correspondingly, for the second network device, the corresponding processing mode is as follows: transmitting downlink scheduling information of the non-terrestrial cell and a cell identification or a carrier identification of the non-terrestrial cell to the first network device.

the downlink scheduling information includes at least one of:

cell group (Cell group) identification information: for example, if the CGs corresponding to the non-terrestrial Cell and the terrestrial cell are different, for example, the non-terrestrial Cell corresponds to an SCG, and the terrestrial cell corresponds to an MCG, 1 bit may be configured to indicate whether the SR corresponds to an MCG or an SCG, or the Cell group numbers corresponding to the non-terrestrial Cell and the terrestrial cell are different, more bits may be configured to indicate the Cell group number corresponding to the SR, or bit mapping may be configured to indicate that the SR corresponds to an SR triggered by those Cell groups;

cell type identification information: for example, 1 bit is configured to indicate whether the non-terrestrial cell or the terrestrial cell;

cell identification information.

In the embodiment of the disclosure, when a terminal aggregates a non-terrestrial cell and a terrestrial cell at the same time, the terrestrial cell is used to assist scheduling of the non-terrestrial cell. Therefore, the scheduling delay of the non-terrestrial cell can be reduced by using the scheme of the embodiment of the disclosure.

In the embodiment of the present disclosure, if the terminal aggregates the non-terrestrial cell and the terrestrial cell at the same time, the terrestrial cell assists the scheduling of the non-terrestrial cell. In the embodiment of the present disclosure, a network device is taken as an example for description. For convenience of description, the first base station referred to hereinafter refers to a base station of a terrestrial cell, and the second base station refers to a base station of a non-terrestrial cell.

Figure 2:
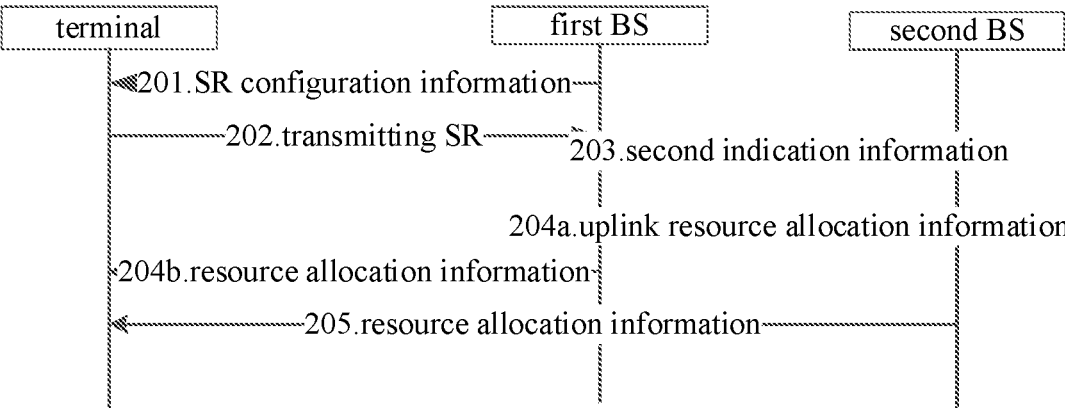
FIG. 2 is a schematic diagram of an uplink dynamic scheduling SR process in an embodiment of the present disclosure.

Referring to FIG. 2, FIG. 2 is a schematic diagram of an uplink dynamic scheduling SR process according to an embodiment of the present disclosure. As shown in FIG. 2, the process may include:

Step 201: the terminal acquiring SR configuration information corresponding to the non-terrestrial cell.

The SR configuration information may include an index number of the SR resource, a prohibit timer length corresponding to the SR, a maximum SR transmission number, and the like. In this step, SR configuration information may be added to only Cell group configuration information corresponding to the terrestrial cell. The configuration information may be transmitted to the terminal by the first base station or the second base station through Radio Resource Control (RRC) signaling. If the second base station sends the information to the terminal through the RRC signaling, the first base station needs to notify the second base station of the SR configuration corresponding to the non-terrestrial cell through an interface between the base stations.

Step 202: transmitting the SR.

When the MAC entity corresponding to the non-terrestrial cell has SR triggering, SR transmitting is carried out by using the SR resource corresponding to the surface cell. To identify SR requests for non-terrestrial cells and for terrestrial cells, a specific approach may be one of the following:

mode 1: when the network configures SR resources for the terminal, the SR resources of the non-terrestrial cell and the terrestrial cell are separated from a time domain and/or a frequency domain;

mode 2: the SR carries first indication information for indicating whether the SR corresponds to a non-terrestrial cell or a terrestrial cell.

Based on the foregoing mode 2, the specific first indication information may be:

cell group (Cell group) identification information: for example, if the CGs corresponding to the non-terrestrial Cell and the terrestrial cell are different, for example, the non-terrestrial Cell corresponds to an SCG, and the terrestrial cell corresponds to an MCG, 1 bit may be configured to indicate whether the SR corresponds to an MCG or an SCG, or the Cell group numbers corresponding to the non-terrestrial Cell and the terrestrial cell are different, more bits may be configured to indicate the Cell group number corresponding to the SR, or bit mapping may be configured to indicate that the SR corresponds to an SR triggered by those Cell groups;

cell type identification information: for example, 1 bit is configured to indicate whether the non-terrestrial cell or the terrestrial cell;

cell identification information.

Step 203: transmitting second indication information.

After receiving the SR aiming at the non-terrestrial cell transmitted by the terminal, the first base station sends indication information to the second base station. This step may be omitted if the first base station and the second base station are the same base station.

The specific content of the second indication information may be one of the following:

logical channel indication information corresponding to the SR;

an SR configuration identification;

the steps 204*a*/204*b* and the step 205 are two schemes in parallel, and in practical application, one of the steps 204*a*/204*b* and the step 205 can be selected to be executed.

Step 204*a*/204*b*: the second base station forwards its uplink resource allocation information to the non-terrestrial cell via the first base station.

If step 204*a*/204*b* is selected, the specific implementation may be one of the following:

mode 1. if the terrestrial cell and the non-terrestrial cell correspond to the same base station, the base station may allocate uplink resources of the non-terrestrial cell to the terminal based on the received SR of the non-terrestrial cell.

mode 2, if the terrestrial cell and the non-terrestrial cell correspond to different base stations, the first base station needs to send second indication information to the second base station through an interface between the base stations, and the second base station allocates resources of the non-terrestrial cell for the terminal based on the second indication information and then informs the first base station.

mode 3: if the terrestrial cell and the non-terrestrial cell correspond to different base stations, the second base station can reserve a resource and send the reserved resource to the first base station through an interface between the base stations, and the first base station directly allocates uplink resources of the non-terrestrial cell for the terminal from the reserved resource after receiving the SR, which is transmitted by the terminal and aims at the non-terrestrial cell.

After determining the resource allocation condition aiming at the non-terrestrial cell, the first base station sends uplink scheduling information to the terminal through the terrestrial cell. If the first base sends the uplink scheduling information to the terminal through the terrestrial cell, the uplink scheduling information at least includes one or the combination of the following information:

cell group (Cell group) identification information: for example, if the CGs corresponding to the non-terrestrial Cell and the terrestrial cell are different, for example, the non-terrestrial Cell corresponds to an SCG, and the terrestrial cell corresponds to an MCG, 1 bit may be configured to indicate whether the SR corresponds to an MCG or an SCG, or the Cell group numbers corresponding to the non-terrestrial Cell and the terrestrial cell are different, more bits may be configured to indicate the Cell group number corresponding to the SR, or bit mapping may be configured to indicate that the SR corresponds to an SR triggered by those Cell groups;

cell type identification information: for example, 1 bit is configured to indicate whether the non-terrestrial cell or the terrestrial cell;

cell identification information.

Step 205: the second base station directly allocating uplink resources for the terminal.

If the terrestrial cell and the non-terrestrial cell correspond to different base stations, the second base station can directly allocate uplink resources of the non-terrestrial cell for the terminal, and directly send uplink scheduling signaling corresponding to the uplink resources through the non-terrestrial cell.

Figure 3:
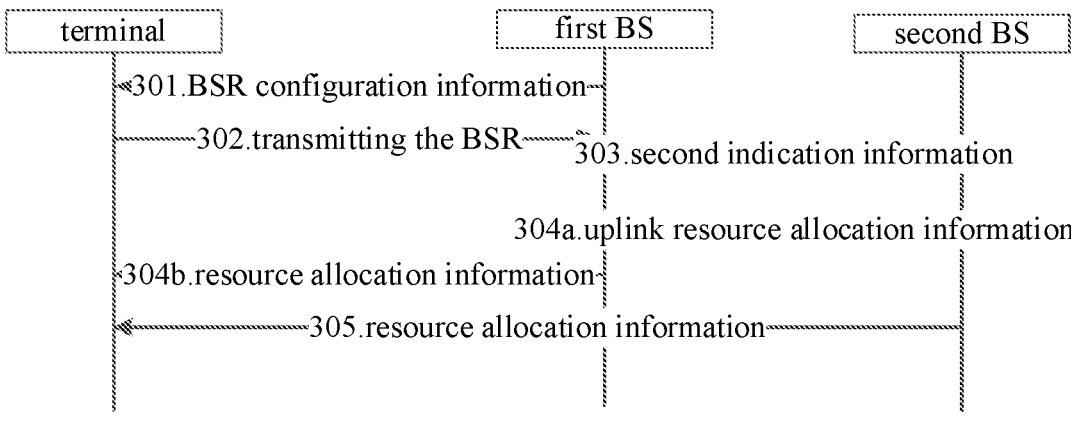
FIG. 3 is a schematic diagram of an uplink dynamic scheduling BSR process in the embodiment of the present disclosure.

Referring to FIG. 3, FIG. 3 is a schematic diagram of an uplink dynamic scheduling BSR process according to an embodiment of the present disclosure. As shown in FIG. 3, the process may include:

Step 301: obtaining BSR configuration information corresponding to the non-terrestrial cell.

The BSR configuration information specifically indicates a mapping relationship between a logical channel and a logical channel group. The configuration information may be transmitted to the terminal by the first base station or the second base station through RRC signaling.

Step 302: transmitting the BSR.

When the MAC entity corresponding to the non-terrestrial cell is triggered by BSR, the uplink resource corresponding to the terrestrial cell can be used for transmitting the BSR.

The specific BSR MAC CE design method may be, but is not limited to:

mode 1: the non-terrestrial cell and the terrestrial cell are transmitted by using the same BSR MAC CE, and the buffer status information corresponding to the non-terrestrial cell and the terrestrial cell is distinguished through the content carried in the BSR MAC CE.

mode 1.1: indicating the cell type through the LCG ID, and configuring different LCG IDs for the non-terrestrial cell and the terrestrial cell;

mode 1.2: adding second indication information in the BSR MAC CE to indicate the cell type corresponding to the logical channel group;

mode 1.3: the protocol appoints the sequence of LCG IDs of the non-terrestrial cell and the terrestrial cell in BSR MAC CE;

method 1.4: the BSR MAC CE adds a bitmap (bitmap) indication to the top to indicate the cell type corresponding to each LCG ID in the BSR.

mode 2: the non-terrestrial cell and the terrestrial cell use independent BSR MAC CEs, and the formats of the BSR MAC CEs of the non-terrestrial cell and the terrestrial cell can be the same but are respectively identified by different LCIDs.

Step 303: transmitting second indication information.

After receiving the BSR aiming at the non-terrestrial cell transmitted by the terminal, the first base station sends second indication information to the second base station. This step may be omitted if the first base station and the second base station are the same base station.

The specific content of the second indication information may be one of the following:

the method includes the steps that a non-terrestrial cell LCG ID and buffer area state system information corresponding to each LCG ID of the non-terrestrial cell are obtained;

the complete BSR MAC CE for the non-terrestrial cell received by the second base station.

The steps 304*a*/304*b* and the step 305 are two schemes in parallel, and in practical applications, one of the steps 304*a*/304*b* and the step 305 can be selected to be executed.

Step 304*a*/304*b*: the second base station forwards its uplink resource allocation information to the non-terrestrial cell via the first base station.

If steps 304*a*/304*b* are selected, the specific implementation may be one of the following:

mode 1. if the terrestrial cell and the non-terrestrial cell correspond to the same base station, the base station may allocate uplink resources of the non-terrestrial cell to the terminal based on the received BSR of the non-terrestrial cell.

mode 2, if the terrestrial cell and the non-terrestrial cell correspond to different base stations, the first base station needs to send second indication information to the second base station through an interface between the base stations, and the second base station allocates resources of the non-terrestrial cell for the terminal based on the second indication information and then informs the first base station.

mode 3: if the terrestrial cell and the non-terrestrial cell correspond to different base stations, the second base station can reserve a resource and send the reserved resource to the first base station through an inter-base station interface, and the first base station directly allocates uplink resources of the non-terrestrial cell for the terminal from the reserved resource after receiving BSR aiming at the non-terrestrial cell transmitted by the terminal.

After determining the resource allocation condition aiming at the non-terrestrial cell, the first base station sends uplink scheduling information of the terrestrial cell to the terminal. If the first base sends the uplink scheduling information to the terminal through the terrestrial cell, the uplink scheduling information at least includes one or the combination of the following information:

cell group (Cell group) identification information: for example, if the CGs corresponding to the non-terrestrial Cell and the terrestrial cell are different, for example, the non-terrestrial Cell corresponds to an SCG, and the terrestrial cell corresponds to an MCG, 1 bit may be configured to indicate whether the SR corresponds to an MCG or an SCG, or the Cell group numbers corresponding to the non-terrestrial Cell and the terrestrial cell are different, more bits may be configured to indicate the Cell group number corresponding to the SR, or bit mapping may be configured to indicate that the SR corresponds to an SR triggered by those Cell groups;

cell type identification information: for example, 1 bit is configured to indicate whether the non-terrestrial cell or the terrestrial cell;

cell identification information.

Step 305: the second base station directly allocating uplink resources for the terminal.

If the terrestrial cell and the non-terrestrial cell correspond to different base stations, the second base station can directly allocate uplink resources of the non-terrestrial cell for the terminal, and directly send uplink scheduling signaling corresponding to the uplink resources through the non-terrestrial cell.

Figure 4:
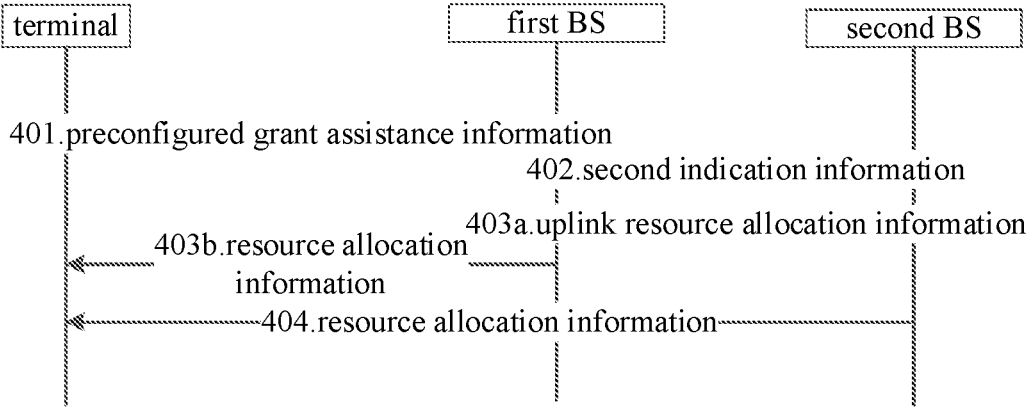
FIG. 4 is a schematic diagram of an uplink preconfigured grant scheduling process in the embodiment of the present disclosure.

Referring to FIG. 4, FIG. 4 is a schematic diagram of an uplink preconfigured grant scheduling process according to an embodiment of the present disclosure. As shown in FIG. 4, the process may include:

Step 401: the terminal sending preconfigured grant assistance information.

This step is an optional step.

The terminal can report the preconfigured grant related assistance information to the network device through the terrestrial cell, where the preconfigured grant assistance information at least carries one or a combination of the following contents:

identification information of a Cell group (Cell group) corresponding to the assistance information: for example, if the CGs corresponding to the non-terrestrial Cell and the terrestrial cell are different, for example, the non-terrestrial Cell corresponds to an SCG, and the terrestrial cell corresponds to an MCG, 1 bit may be configured to indicate whether the SR corresponds to an MCG or an SCG, or the Cell group numbers corresponding to the non-terrestrial Cell and the terrestrial cell are different, more bits may be configured to indicate the Cell group number corresponding to the SR, or bit mapping may be configured to indicate that the SR corresponds to an SR triggered by those Cell groups;

cell type identification information corresponding to the assistance information: for example, 1 bit is configured to indicate whether the non-terrestrial cell or the terrestrial cell;

the logical channel identification information corresponding to the assistance information.

Step 402: transmitting second indication information.

After receiving the preconfigured grant assistance information aiming at the non-terrestrial cell transmitted by the terminal, the first base station sends indication information to the second base station. This step may be omitted if the first base station and the second base station are the same base station.

The specific content of the second indication information may be one or a combination of the following:

preconfigured grant assistance information corresponding to the non-terrestrial cell;

the steps 403*a*/403*b* and the step 404 are two schemes in parallel, and in practical applications, one of the steps 403*a*/403*b* and the step 404 can be selected to be executed.

Step 403*a*/403*b*: the second base station forwards its uplink resource allocation information to the non-terrestrial cell via the first base station.

If step 403*a*/403*b* is selected, the specific implementation may be one of the following:

mode 1. if the terrestrial cell and the non-terrestrial cell correspond to the same base station, the base station may allocate uplink resources of the non-terrestrial cell to the terminal based on the received preconfigured grant assistance information of the non-terrestrial cell.

mode 2, if the terrestrial cell and the non-terrestrial cell correspond to different base stations, the first base station needs to send second indication information to the second base station through an interface between the base stations, and the second base station allocates resources of the non-terrestrial cell for the terminal based on the second indication information and then informs the first base station.

mode 3: if the terrestrial cell and the non-terrestrial cell correspond to different base stations, the second base station can reserve a resource and send the reserved resource to the first base station through an interface between the base stations, and the first base station directly allocates uplink resources of the non-terrestrial cell for the terminal from the reserved resource after receiving preconfigured grant assistance information which is transmitted by the terminal and aims at the non-terrestrial cell.

After determining the resource allocation condition aiming at the non-terrestrial cell, the first base station sends uplink scheduling information to the terminal through the terrestrial cell. If the first base sends the uplink scheduling information to the terminal through the terrestrial cell, the uplink scheduling information at least includes one or the combination of the following information:

cell group (Cell group) identification information: for example, if the CGs corresponding to the non-terrestrial Cell and the terrestrial cell are different, for example, the non-terrestrial Cell corresponds to an SCG, and the terrestrial cell corresponds to an MCG, 1 bit may be configured to indicate whether the SR corresponds to an MCG or an SCG, or the Cell group numbers corresponding to the non-terrestrial Cell and the terrestrial cell are different, more bits may be configured to indicate the Cell group number corresponding to the SR, or bit mapping may be configured to indicate that the SR corresponds to an SR triggered by those Cell groups;

cell type identification information: for example, 1 bit is configured to indicate whether the non-terrestrial cell or the terrestrial cell;

cell identification information.

Step 404: the second base station directly allocating uplink resources for the terminal and sends resource allocation information to the terminal.

If the terrestrial cell and the non-terrestrial cell correspond to different base stations, the second base station can directly allocate uplink resources of the non-terrestrial cell for the terminal, and directly send uplink scheduling signaling corresponding to the uplink resources through the non-terrestrial cell.

Figure 5:
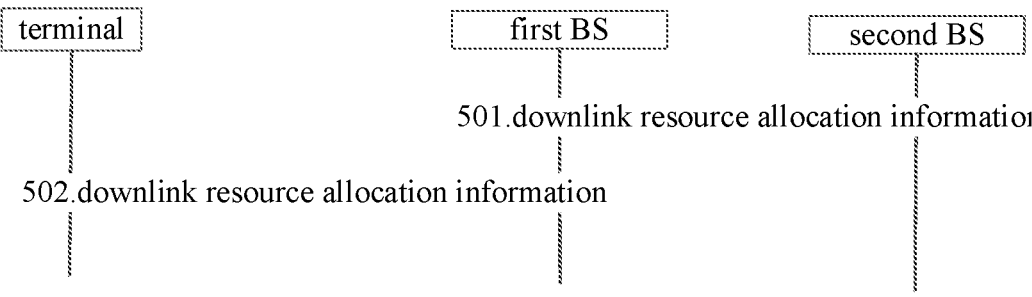
FIG. 5 is a schematic diagram of a downlink dynamic scheduling process in an embodiment of the present disclosure.

Referring to FIG. 5, FIG. 5 is a schematic diagram of a downlink dynamic scheduling process according to an embodiment of the present disclosure. As shown in FIG. 5, the process may include:

Step 501: the second base station transmitting downlink scheduling information for the non-terrestrial cell to the first base station.

The base station corresponding to the non-terrestrial cell needs to notify the base station corresponding to the terrestrial cell of the downlink scheduling information of the non-terrestrial cell and the cell/carrier identification of the non-terrestrial cell through an interface between the base stations.

Step 502: the first base station sending downlink scheduling information of the non-terrestrial cell to the terminal.

The first base station sends downlink scheduling information aiming at the non-terrestrial cell through the terrestrial cell, and the specific scheduling information at least includes one or a combination of the following information:

cell group (Cell group) identification information: for example, if the CGs corresponding to the non-terrestrial Cell and the terrestrial cell are different, for example, the non-terrestrial Cell corresponds to an SCG, and the terrestrial cell corresponds to an MCG, 1 bit may be configured to indicate whether the SR corresponds to an MCG or an SCG, or the Cell group numbers corresponding to the non-terrestrial Cell and the terrestrial cell are different, more bits may be configured to indicate the Cell group number corresponding to the SR, or bit mapping may be configured to indicate that the SR corresponds to an SR triggered by those Cell groups;

cell type identification information: for example, 1 bit is configured to indicate whether the non-terrestrial cell or the terrestrial cell;

cell identification information.

In the embodiment of the disclosure, when a terminal aggregates a non-terrestrial cell and a terrestrial cell at the same time, the terrestrial cell is used to assist scheduling of the non-terrestrial cell. Therefore, the scheduling delay of the non-terrestrial cell can be reduced by using the scheme of the embodiment of the disclosure.

Figure 6:
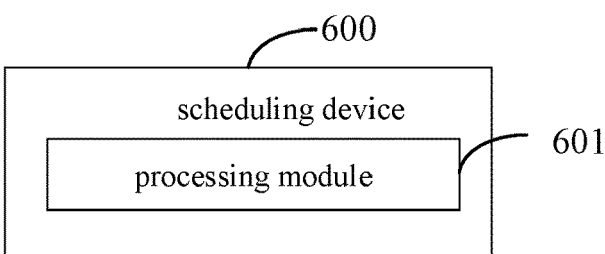
FIG. 6 is a structural diagram of a scheduling device in an embodiment of the present disclosure.

The embodiment of the disclosure also provides a scheduling device. Referring to FIG. 6, FIG. 6 is a structural diagram of a scheduling device provided in an embodiment of the present disclosure. Because the principle of the scheduling device for solving the problem is similar to the scheduling method in the embodiment of the present disclosure, the implementation of the scheduling device may refer to the implementation of the method, and repeated parts are not described again.

As shown in FIG. 6, the scheduling device 600 includes: a processing module 601, configured to assist scheduling of a non-terrestrial cell by using a terrestrial cell when a terminal aggregates the non-terrestrial cell and the terrestrial cell at the same time.

The device shown in FIG. 6 can be applied to a terminal, and at this time:

optionally, the processing module 601 is configured to, for the scheduling request SR, send the SR of the non-terrestrial cell by using the SR resource configured for the terrestrial cell.

Optionally, when the processing module 601 sends the SR of the non-terrestrial cell by using the SR resource configured for the terrestrial cell, identify the SR of the non-terrestrial cell by any one of the following manners, including:

receiving SR resource configuration information configured for the terrestrial cell by network device, where the SR resource configuration information is distinguished from the time domain and/or the frequency domain aiming at SR resources configured for the terrestrial cell and the non-terrestrial cell, and selecting an SR resource corresponding to the non-terrestrial cell from the SR resources configured for the terrestrial cell according to the SR resource configuration information to send an SR of the non-terrestrial cell;

carrying first indication information in the SR, where the first indication information is configured to indicate whether the SR is the SR of the terrestrial cell or the SR of the non-terrestrial cell.

Optionally, the first indication information includes at least one of:

cell group identification information;

cell type identification information;

optionally, for the BSR process of reporting the buffer status, the processing module 601 assists the scheduling of the non-terrestrial cell by using the terrestrial cell in any one of the following manners:

transmitting BSR by using the same BSR media access control control element (MAC CE), where the indication information carried by the BSR MAC CE is configured to distinguish whether the BS contained in the BSR MAC CE is the BS aiming at the terrestrial cell or the BS aiming at the non-terrestrial cell;

transmitting respectively the BS of the terrestrial cell and the BS of the non-terrestrial cell by using different BSR MAC CEs.

Optionally, the indication information includes any one of the following items:

a logical channel group identification (LCG ID);

cell type indication information.

Optionally, if the indication information includes a logical channel group identification, distinguishing, by using the indication information carried by the BSR MAC CE, whether the buffer status BS included in the BSR MAC CE is a BS for the terrestrial cell or a BS for the non-terrestrial cell, where the distinguishing includes one of:

the value ranges of the logical channel group identification corresponding to the non-terrestrial cell and the logical channel group identification corresponding to the terrestrial cell are different;

distinguishing by using the sequence of the logical channel group in the BSR MAC CE, where the sequence of the logical channel group identifications corresponding to the non-terrestrial cell and the terrestrial cell in the BSR MAC CE is fixed, agreed by a protocol or configured by network device.

Optionally, if the indication information includes cell type indication information, distinguishing, by using the indication information carried by the BSR MAC CE, whether the buffer status BS included in the BSR MAC CE is a BS for the terrestrial cell or a BS for the non-terrestrial cell, where the distinguishing includes one of:

adding 1 bit of cell type indication information before each logical channel group identification contained in the BSR MAC CE;

adding bit mapping indication information to the payload of the BSR MAC CE, where the bit mapping indication information is configured to indicate each logical channel group identification and/or a cell type corresponding to the BS in the BSR MAC CE.

Optionally, the processing module 601 is further specifically configured to transmit the BS of the terrestrial cell and the BS of the non-terrestrial cell by using different BSR MAC CEs in the following manners:

the MAC subheader corresponding to the BSR MAC CE of the terrestrial cell and the MAC subheader corresponding to the BSR MAC CE of the non-terrestrial cell use different logical channel identifications LCIDs, or, adding indication information in an MAC subheader corresponding to the BSR MAC CE or in the BSR MAC CE, where the indication information is configured to indicate that the BSR MAC CE corresponds to a terrestrial cell or a non-terrestrial cell; or the LCG ID identifications used by the non-terrestrial cell and the terrestrial cell have different value ranges.

Optionally, for the reporting process of the preconfigured grant assistance information, the processing module 601 is further specifically configured to report the preconfigured grant assistance information of the non-terrestrial cell through the terrestrial cell, where the preconfigured grant assistance information carries indication information, and the indication information is used to determine that the assistance information is for the non-terrestrial cell.

Optionally, the indication information includes at least one of:

cell group identification information corresponding to the preconfigured grant assistance information;

cell type identification information corresponding to the preconfigured grant assistance information;

the logical channel identification information corresponding to the preconfigured grant assistance information.

Optionally, the processing module 601 is further specifically configured to receive uplink scheduling information and/or downlink scheduling information, which are transmitted by a network device and are addressed to the non-terrestrial cell, where the uplink scheduling information and/or the downlink scheduling information are transmitted by the network device through the terrestrial cell.

the uplink scheduling information and/or the downlink scheduling information includes at least one of:

cell group identification information;

cell type identification information;

cell identification information.

The device provided in the embodiment of the present disclosure may implement the method embodiments, and the implementation principle and technical effects are similar, which are not described herein again.

Referring back to FIG. 6, the device shown in FIG. 6 can be applied to a network device, and in this case, the processing module 601 is configured to assist scheduling of a non-terrestrial cell by using a terrestrial cell in a case that a terminal aggregates the non-terrestrial cell and the terrestrial cell at the same time.

Optionally, the processing module 601 includes:

an allocating submodule, configured to allocate uplink resources of the non-terrestrial cell to the terminal according to the SR or the BSR or the preconfigured grant assistance information;

a transmitting submodule, configured to transmit the uplink scheduling information to the terminal according to the distribution result of the uplink resources.

Specifically, in a case that the terrestrial cell and the non-terrestrial cell correspond to the same network device, the allocating sub-module is configured to allocate uplink resources of the non-terrestrial cell to the terminal directly according to the SR or the BSR or the preconfigured grant assistance information.

The network device may be a first network device when the terrestrial cell corresponds to a first network device and the non-terrestrial cell corresponds to a second network device. At this time, the allocating sub-module is further configured to allocate uplink resources of the non-terrestrial cell to the terminal according to the SR or the BSR or the preconfigured grant assistance information in any one of the following manners:

transmitting third indication information to the second network device, where the third indication information is configured to indicate the second network device to allocate uplink resources of the non-terrestrial cell to the terminal;

acquiring reserved resources from the second network device, and allocating uplink resources of the non-terrestrial cell for the terminal from the reserved resources according to the SR or the BSR or the preconfigured grant assistance information.

The network device may be a second network device when the terrestrial cell corresponds to a first network device and the non-terrestrial cell corresponds to a second network device. At this time, the allocating sub-module is further configured to allocate uplink resources of the non-terrestrial cell to the terminal according to the SR or the BSR or the preconfigured grant assistance information in any one of the following manners:

receiving third indication information transmitted by the first network device, and allocating uplink resources of the non-terrestrial cell to the terminal according to the third indication information;

transmitting the reserved resources to the first network device.

the third indication information includes at least one of:

logical channel indication information corresponding to the SR;

an SR configuration identification;

the logical channel group identification and the logical new channel group buffer status information of the non-terrestrial cell;

a BSR MAC CE for the non-terrestrial cell;

the preconfigured grant assistance information corresponding to the non-terrestrial cell.

The network device may be a second network device when the terrestrial cell corresponds to a first network device and the non-terrestrial cell corresponds to a second network device. At this time, the transmitting submodule is specifically configured to send uplink scheduling information of the non-terrestrial cell to the terminal; or, the uplink scheduling information of the non-terrestrial cell is transmitted to the first network device, so that the first network device sends the uplink scheduling information of the non-terrestrial cell to the terminal through the terrestrial cell.

In a case that the first network device sends uplink scheduling information of the non-terrestrial cell to the terminal through the terrestrial cell, the uplink scheduling information includes at least one of:

cell group identification information;

a cell type identification;

cell identification information.

The network device may be a first network device when the terrestrial cell corresponds to a first network device and the non-terrestrial cell corresponds to a second network device. For downlink scheduling, the processing module 601 is further specifically configured to receive downlink scheduling information of the non-terrestrial cell and a cell identification or a carrier identification of the non-terrestrial cell, where the downlink scheduling information is transmitted by the second network device; transmitting downlink scheduling information of the non-terrestrial cell to the terminal through the terrestrial cell.

The network device may be a second network device when the terrestrial cell corresponds to a first network device and the non-terrestrial cell corresponds to a second network device. For downlink scheduling, the processing module 601 is further specifically configured to send downlink scheduling information of the non-terrestrial cell and a cell identification or a carrier identification of the non-terrestrial cell to the first network device.

The device provided in the embodiment of the present disclosure may implement the method embodiments, and the implementation principle and technical effects are similar, which are not described herein again.

Figure 7:
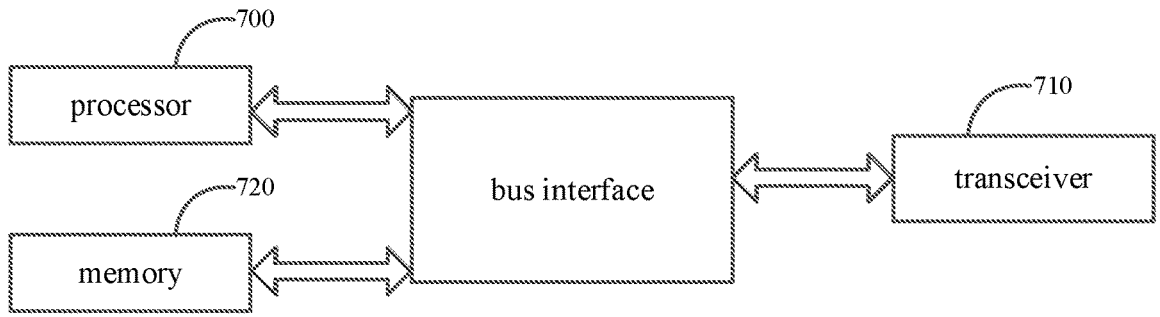
FIG. 7 is a first block diagrams of a communication device in the embodiment of the present disclosure.

As shown in FIG. 7, a communication device according to an embodiment of the present disclosure is applied to a network device, and includes: the processor 700, which is used to read the program in the memory 720, executes the following processes:

in a case that the terminal simultaneously aggregates the non-terrestrial cell and the terrestrial cell, using the terrestrial cell to assist a scheduling of the non-terrestrial cell.

A transceiver 710 for receiving transmitting data under the control of the processor 700.

In FIG. 7 the bus architecture may include any number of interconnected buses and bridges, with one or more processors, represented by processor 700, and various circuits, represented by memory 720, being linked together. The bus architecture may also link together various other circuits such as peripherals, voltage regulators, power management circuits, and the like, which are well known in the art, and therefore, will not be described any further herein. The bus interface provides an interface. The transceiver 710 may be a plurality of elements including a transmitter and a receiver that provide a means for communicating with various other device over a transmission medium. The processor 700 is responsible for managing the bus architecture and general processing, and the memory 720 may store data used by the processor 700 in performing operations.

The processor 700 is responsible for managing the bus architecture and general processing, and the memory 720 may store data used by the processor 700 in performing operations.

The processor 700 is further configured to read the program and execute: and for SR, transmitting the SR of the non-terrestrial cell through the SR resource configured by the terrestrial cell.

The processor 700 is further configured to read the program and execute:

in a case that an SR or BSR or preconfigured grant assistance information of the terminal is received, allocating uplink resources of the non-terrestrial cell for the terminal according to the SR or BSR or preconfigured grant assistance information;

transmitting uplink scheduling information to the terminal according to the allocation result of the uplink resources.

The processor 700 is further configured to read the program and execute:

in a case that the terrestrial cell and the non-terrestrial cell correspond to the same network device, allocating directly uplink resources of the non-terrestrial cell to the terminal according to the SR or the BSR or the preconfigured grant assistance information.

Under the condition that the terrestrial cell corresponds to a first network device and the non-terrestrial cell corresponds to a second network device, the network device is a first network device; the processor 700 is further configured to read the program and execute any one of the following processes:

transmitting third indication information to the second network device, where the third indication information is configured to indicate the second network device to allocate uplink resources of the non-terrestrial cell to the terminal;

acquiring reserved resources from the second network device, and allocating uplink resources of the non-terrestrial cell for the terminal from the reserved resources according to the SR or the BSR or the preconfigured grant assistance information.

Under the condition that the terrestrial cell corresponds to a first network device and the non-terrestrial cell corresponds to a second network device, the network device is a second network device; the processor 700 is further configured to read the program and execute:

the processor 700 is further configured to read the program and execute any one of the following processes:

receiving third indication information transmitted by the first network device, and allocating uplink resources of the non-terrestrial cell to the terminal according to the third indication information;

transmitting the reserved resources to the first network device.

In the case where the terrestrial cell corresponds to a first network device and the non-terrestrial cell corresponds to a second network device, the processor 700 is further configured to read the program and execute:

transmitting uplink scheduling information of the non-terrestrial cell to the terminal; or transmitting uplink scheduling information of the non-terrestrial cell to the first network device so that the first network device sends the uplink scheduling information of the non-terrestrial cell to the terminal through the terrestrial cell.

Under the condition that the terrestrial cell corresponds to a first network device and the non-terrestrial cell corresponds to a second network device, the network device is a first network device; the processor 700 is further configured to read the program and execute:

for downlink scheduling, receiving downlink scheduling information of the non-terrestrial cell and a cell identification or a carrier identification of the non-terrestrial cell, which are transmitted by the second network device;

transmitting downlink scheduling information of the non-terrestrial cell to the terminal through the terrestrial cell.

The device provided in the embodiment of the present disclosure may execute the method embodiments, and the implementation principle and technical effects are similar, which are not described herein again.

Figure 8:
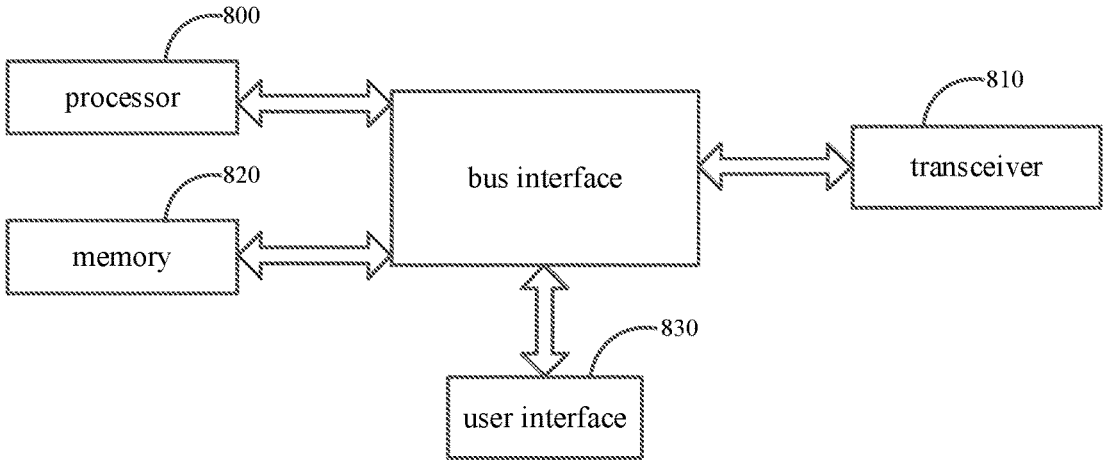
FIG. 8 is a second block diagram of a communication device in an embodiment of the present disclosure.

As shown in FIG. 8, the communication device according to the embodiment of the present disclosure is applied to a terminal, and includes: the processor 800, which is used to read the program in the memory 820, executes the following processes:

in a case that the terminal simultaneously aggregates the non-terrestrial cell and the terrestrial cell, using the terrestrial cell to assist a scheduling of the non-terrestrial cell.

A transceiver 810 for receiving transmitting data under the control of the processor 800.

In FIG. 8 the bus architecture may include any number of interconnected buses and bridges, with one or more processors represented by processor 800 and various circuits of memory represented by memory 820 being linked together. The bus architecture may also link together various other circuits such as peripherals, voltage regulators, power management circuits, and the like, which are well known in the art, and therefore, will not be described any further herein. The bus interface provides an interface. The transceiver 810 may be a number of elements including a transmitter and a receiver that provide a means for communicating with various other device over a transmission medium. The user interface 830 may also be an interface capable of interfacing externally to a desired device for different user devices, including but not limited to a keypad, display, speaker, microphone, joystick, etc.

The processor 800 is responsible for managing the bus architecture and general processing, and the memory 820 may store data used by the processor 800 in performing operations.

The processor 800 is further configured to read the program and execute:

and for SR, transmitting the SR of the non-terrestrial cell through the SR resource configured by the terrestrial cell.

The processor 800 is further configured to read the program and execute:

when the SR of the non-terrestrial cell is transmitted through the SR resource configured for the terrestrial cell, identifying the SR of the non-terrestrial cell by any one of the following modes, including:

receiving SR resource configuration information configured for the terrestrial cell by network device, where the SR resource configuration information is distinguished from the time domain and/or the frequency domain aiming at SR resources configured for the terrestrial cell and the non-terrestrial cell, and selecting an SR resource corresponding to the non-terrestrial cell from the SR resources configured for the terrestrial cell according to the SR resource configuration information to send an SR of the non-terrestrial cell;

carrying first indication information in the SR, where the first indication information is configured to indicate whether the SR is the SR of the terrestrial cell or the SR of the non-terrestrial cell.

The processor 800 is further configured to read the program and execute:

for the buffer status reporting BSR process, the terrestrial cell is used to assist the scheduling of the non-terrestrial cell by any of the following means:

transmitting BSR by using the same BSR media access control control element (MAC CE), where the indication information carried by the BSR MAC CE is configured to distinguish whether the BS contained in the BSR MAC CE is the BS aiming at the terrestrial cell or the BS aiming at the non-terrestrial cell;

transmitting respectively the BS of the terrestrial cell and the BS of the non-terrestrial cell by using different BSR MAC CEs.

The processor 800 is further configured to read the program and execute:

for a reporting process of the preconfigured grant assistance information, reporting the preconfigured grant assistance information of the non-terrestrial cell through the terrestrial cell, where the preconfigured grant assistance information carries indication information, and the indication information is configured to determine that the assistance information is for the non-terrestrial cell.

The processor 800 is further configured to read the program and execute:

receiving uplink scheduling information and/or downlink scheduling information which is transmitted by network device and aims at the non-terrestrial cell, where the uplink scheduling information and/or the downlink scheduling information are transmitted by the network device through the terrestrial cell.

The device provided in the embodiment of the present disclosure may execute the method embodiments, and the implementation principle and technical effects are similar, which are not described herein again.

The embodiments of the present disclosure further provide a readable storage medium, where a program is stored, and when the program is executed by a processor, the program implements the processes of the foregoing scheduling method embodiment, and can achieve the same technical effects, and in order to avoid repetition, the detailed description is omitted here. The readable storage medium may be a Read-Only Memory (ROM), a Random Access Memory (RAM), a magnetic disk or an optical disk.

It should be noted that, in this document, the terms "includes," "including," or any other variation thereof, are intended to cover a non-exclusive inclusion, such that a process, method, article, or device that includes a list of elements does not include only those elements but may include other elements not expressly listed or inherent to such process, method, article, or device. Without further limitation, an element identified by the phrase "including an . . . " does not exclude the presence of other identical elements in the process, method, article, or device that includes the element.

Those of ordinary skill in the art will appreciate that the various illustrative elements and algorithm steps described in connection with the embodiments disclosed herein may be implemented as electronic hardware, or combinations of computer software and electronic hardware. Whether such functionality is implemented as hardware or software depends upon the particular application and design constraints imposed on the technical solution. Skilled artisans may implement the described functionality in varying ways for each particular application, but such implementation decisions should not be interpreted as causing a departure from the scope of the present disclosure.

It can be clearly understood by those skilled in the art that, for convenience and simplicity of description, the specific working processes of the above-described systems, devices and units may refer to the corresponding processes in the foregoing method embodiments, and are not described herein again.

In the embodiments provided in the present application, it should be understood that the disclosed device and method may be implemented in other ways. For example, the above-described device embodiments are merely illustrative, and for example, the division of the units is only one type of logical functional division, and other divisions may be realized in practice, for example, multiple units or components may be combined or integrated into another system, or some features may be omitted, or not executed. In addition, the shown or discussed mutual coupling or direct coupling or communication connection may be an indirect coupling or communication connection through some interfaces, devices or units, and may be in an electrical, mechanical or other form.

The units described as separate parts may or may not be physically separate, and parts displayed as units may or may not be physical units, may be located in one position, or may be allocated on multiple network units. Some or all of the units can be selected according to actual needs to achieve the purpose of the solution of the embodiment.

In addition, functional units in the embodiments of the present disclosure may be integrated into one processing unit, or each unit may exist alone physically, or two or more units are integrated into one unit.

Through the description of the foregoing embodiments, it is clear to those skilled in the art that the method of the foregoing embodiments may be implemented by software plus a necessary general hardware platform, and certainly may also be implemented by hardware, but in many cases, the former is a better implementation. With such understanding, the technical solutions of the present disclosure or portions thereof contributing to the related art may be embodied in the form of a software product, which is stored in a storage medium (such as ROM/RAM, magnetic disk, optical disk) and includes several instructions for enabling a terminal (which may be a mobile phone, a computer, a server, an air conditioner, or a network device, etc.) to execute the methods according to the embodiments of the present disclosure.

It will be understood by those skilled in the art that all or part of the processes of the methods of the embodiments described above may be implemented by controlling related hardware through a computer program, where the computer program may be stored in a computer-readable storage medium, and when executed, the computer program may include the processes of the embodiments of the methods described above. The storage medium may be a magnetic disk, an optical disk, a Read-Only Memory (ROM), a Random Access Memory (RAM), or the like.

It is to be understood that the embodiments described in connection with the embodiments of the present disclosure may be implemented in hardware, software, firmware, middleware, microcode, or a combination thereof. For a hardware implementation, the modules, units, and sub-units may be implemented in one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose processors, controllers, micro-controllers, microprocessors, other electronic units designed to perform the functions described in this disclosure, or a combination thereof.

For a software implementation, the techniques described in the embodiments of the present disclosure may be implemented with modules (e.g., process, functions, and so on) that perform the functions described in the embodiments of the present disclosure. The software codes may be stored in a memory and executed by a processor. The memory may be implemented within the processor or external to the processor.

While the embodiments of the present disclosure have been described in connection with the appended drawings, the present disclosure is not limited to the specific embodiments, which have been described above for illustrative purposes only and not for purposes of limitation, and it will be appreciated by those of ordinary skill in the art that, in light of the present disclosure, numerous modifications may be made without departing from the spirit of the disclosure and scope of the appended claims.

What is claimed is:

1. A scheduling method, applied to a terminal and comprising:

in a case that the terminal simultaneously aggregates a non-terrestrial cell and a terrestrial cell, using the terrestrial cell to assist a scheduling of the non-terrestrial cell;

wherein for a Scheduling Request (SR), the using the terrestrial cell to assist the scheduling of the non-terrestrial cell comprises:

transmitting an SR of the non-terrestrial cell through a SR resource configured by the terrestrial cell;

wherein the transmitting the SR of the non-terrestrial cell through the SR resource configured by the terrestrial cell comprises:

receiving SR resource configuration information configured by the terrestrial cell by a network device, wherein a SR resource configured for the terrestrial cell and a SR resource configured for the non-terrestrial cell in the SR resource configuration information are distinguished by a time domain and/or a frequency domain, and the SR resource configured for the non-terrestrial cell is selected according to the SR resource configuration information to send the SR of the non-terrestrial cell; and/or carrying first indication information in an SR, wherein the first indication information is configured to indicate whether the SR is the SR of the terrestrial cell or the SR of the non-terrestrial cell;

wherein the first indication information comprises at least one of:

cell group identification information;

cell type identification information; or cell identification information;

and/or, wherein for a Buffer Status Reporting (BSR) process, the using the terrestrial cell to assist the scheduling of the non-terrestrial cell comprises:

transmitting the BSR by using the same BSR media access control control element (MAC CE), wherein second indication information carried by the BSR MAC CE is configured to distinguish whether the BS contained in the BSR MAC CE is the BS aiming at the terrestrial cell or the BS aiming at the non-terrestrial cell, and the second indication information comprises any one of a logical channel group identification (LCG ID) or cell type indication information; and/or transmitting respectively the BS of the terrestrial cell and the BS of the non-terrestrial cell by using different BSR MAC CEs.

2. The method according to claim 1, wherein when the second indication information comprises the LCG ID, the indication information carried by the BSR MAC CE is configured to distinguish whether the BS contained in the BSR MAC CE is the BS aiming at the terrestrial cell or the BS aiming at the non-terrestrial cell by:

value ranges of the logical channel group identification corresponding to the non-terrestrial cell and the logical channel group identification corresponding to the terrestrial cell are different; or whether the BS contained in the BSR MAC CE is the BS aiming at the terrestrial cell or the BS aiming at the non-terrestrial cell is distinguished by using a sequence of the logical channel group in the BSR MAC CE, wherein the sequence of the logical channel group identifications corresponding to the non-terrestrial cell and the terrestrial cell in the BSR MAC CE is fixed, agreed by a protocol or configured by the network device;

and/or when the second indication information comprises the cell type indication information, the indication information carried by the BSR MAC CE is configured to distinguish whether the BS contained in the BSR MAC CE is the BS aiming at the terrestrial cell or the BS aiming at the non-terrestrial cell by:

adding 1bit of cell type indication information before each logical channel group identification contained in the BSR MAC CE; or adding bit mapping indication information to a payload of the BSR MAC CE, wherein the bit mapping indication information is configured to indicate each logical channel group identification and/or a cell type corresponding to the BS in the BSR MAC CE;

and/or wherein the transmitting respectively the BS of the terrestrial cell and the BS of the non-terrestrial cell by using different BSR MAC CEs comprises:

an MAC subheader corresponding to the BSR MAC CE of the terrestrial cell and an MAC subheader corresponding to the BSR MAC CE of the non-terrestrial cell using different LCIDs; or adding indication information in an MAC subheader corresponding to the BSR MAC CE or in the BSR MAC CE, wherein the indication information is configured to indicate that the BSR MAC CE corresponds to whether the terrestrial cell or the non-terrestrial cell; or the LCG ID identifications used by the non-terrestrial cell and the terrestrial cell being in different value ranges.

3. The method according to claim 1, wherein for a reporting process of preconfigured grant assistance information, the using the terrestrial cell to assist the scheduling of the non-terrestrial cell comprises:

reporting the preconfigured grant assistance information of the non-terrestrial cell through the terrestrial cell, wherein the preconfigured grant assistance information carries third indication information, and the third indication information is configured to determine that the assistance information is for the non-terrestrial cell;

wherein the third indication information comprises at least one of:

cell group identification information corresponding to the preconfigured grant assistance information;

cell type identification information corresponding to the preconfigured grant assistance information; or logical channel identification information corresponding to the preconfigured grant assistance information.

4. The method according to claim 1, wherein the using terrestrial cell to assist the scheduling of the non-terrestrial cell comprises:

receiving uplink scheduling information and/or downlink scheduling information transmitted by the network device for the non-terrestrial cell, wherein the uplink scheduling information and/or the downlink scheduling information are transmitted by the network device through the terrestrial cell;

wherein the uplink scheduling information and/or downlink scheduling information comprises at least one of:

cell group identification information;

cell type identification information; or cell identification information.

5. A scheduling method, applied to network device and comprising:

in a case that a terminal simultaneously aggregates a non-terrestrial cell and a terrestrial cell, using the terrestrial cell to assist a scheduling of the non-terrestrial cell;

wherein in a case that a Scheduling Request (SR) or a Buffer Status Reporting (BSR) or preconfigured grant assistance information of the terminal is received, the using the terrestrial cell to assist the scheduling of the non-terrestrial cell comprises:

allocating an uplink resource of the non-terrestrial cell to the terminal, according to the SR or the BSR or the preconfigured grant assistance information;

transmitting uplink scheduling information to the terminal according to an allocation result of the uplink resource;

wherein the allocating the uplink resource of the non-terrestrial cell to the terminal according to the SR or the BSR or the preconfigured grant assistance information comprises:

Method (i): in the case that the terrestrial cell corresponds to a first network device and the non-terrestrial cell corresponds to a second network device, the network device is the first network device;

transmitting fourth indication information to the second network device, wherein the fourth indication information is configured to indicate the second network device to allocate an uplink resource for the non-terrestrial cell to the terminal; and/or acquiring a reserved resource from the second network device, and allocating an uplink resource of the non-terrestrial cell to the terminal from the reserved resource according to the SR or the BSR or the pre-configured grant assistance information;

Method (ii): in the case that the terrestrial cell corresponds to a first network device and the non-terrestrial cell corresponds to a second network device, the network device is the second network device;

receiving fourth indication information transmitted by the first network device, and allocating the uplink resource of the non-terrestrial cell to the terminal according to the fourth indication information; and/or transmitting a reserved resource to the first network device;

wherein the fourth indication information comprises at least one of:

logical channel indication information corresponding to the SR;

an SR configuration identification;

a logical channel group identification and a logical channel group buffer status information of the non-terrestrial cell;

a BSR MAC CE of the non-terrestrial cell; or preconfigured grant assistance information corresponding to the non-terrestrial cell.

6. The method according to claim 5, wherein the allocating the uplink resource of the non-terrestrial cell to the terminal according to the SR or the BSR or the preconfigured grant assistance information comprises:

in a case that the terrestrial cell and the non-terrestrial cell correspond to a same network device, allocating directly the uplink resource of the non-terrestrial cell to the terminal according to the SR or the BSR or the preconfigured grant assistance information.

7. The method according to claim 5, wherein the transmitting the uplink scheduling information to the terminal according to the allocation result of the uplink resource comprises:

in the case that the terrestrial cell corresponds to the first network device and the non-terrestrial cell corresponds to the second network device the second network device transmitting uplink scheduling information of the non-terrestrial cell to the terminal; or the second network device transmitting uplink scheduling information of the non-terrestrial cell to the first network device, and the first network device transmitting the uplink scheduling information of the non-terrestrial cell to the terminal through the terrestrial cell;

wherein in the case that the first network device transmits the uplink scheduling information of the non-terrestrial cell to the terminal through the terrestrial cell, the uplink scheduling information comprises at least one of:

cell group identification information;

cell type identification information; or cell identification information.

8. The method according to claim 5, wherein for a downlink scheduling, the using the terrestrial cell to assist the scheduling of the non-terrestrial cell comprises:

Method (i): in the case that the terrestrial cell corresponds to the first network device and the non-terrestrial cell corresponds to the second network device, the network device is the first network device, receiving downlink scheduling information of the non-terrestrial cell and a cell identification or a carrier identification of the non-terrestrial cell which are transmitted by the second network device;

transmitting downlink scheduling information of the non-terrestrial cell to the terminal through the terrestrial cell;

Method (ii): in the case that the terrestrial cell corresponds to the first network device and the non-terrestrial cell corresponds to the second network device, the network device is the second network device;

transmitting downlink scheduling information of the non-terrestrial cell and a cell identification or a carrier identification of the non-terrestrial cell to the first network device;

wherein the downlink scheduling information comprises at least one of:

cell group identification information;

cell type identification information; or cell identification information.

9. A communication device, applied to the network device and comprising: a transceiver, a memory, a processor, and a program stored on the memory and executable on the processor; wherein the processor is configured to read the program in the memory to perform the scheduling method according to claim 5.

10. The communication device according to claim 9, wherein the processor is further configured to read the program in the memory to perform:

in a case that the terrestrial cell and the non-terrestrial cell correspond to a same network device, allocating directly the uplink resource of the non-terrestrial cell to the terminal according to the SR or the BSR or the preconfigured grant assistance information.

11. A communication device, applied to a terminal and comprising:

a transceiver, a memory, a processor, and a program stored on the memory and executable on the processor; wherein the processor is configured to read the program in the memory to perform:

in a case that the terminal simultaneously aggregates a non-terrestrial cell and a terrestrial cell, using the terrestrial cell to assist a scheduling of the non-terrestrial cell;

wherein the processor is further configured to read the program in the memory to perform:

for a Scheduling Request (SR), transmitting an SR of the non-terrestrial cell through a SR resource configured by the terrestrial cell;

wherein the processor is further configured to read the program in the memory to perform:

receiving SR resource configuration information configured for the terrestrial cell by a network device, wherein a SR resource configured for the terrestrial cell and a SR resource configured for the non-terrestrial cell in the SR resource configuration information are distinguished by a time domain and/or a frequency domain, and the SR resource configured for the non-terrestrial cell is selected according to the SR resource configuration information to send the SR of the non-terrestrial cell; and/or carrying first indication information in an SR, wherein the first indication information is configured to indicate whether the SR is the SR of the terrestrial cell or the SR of the non-terrestrial cell;

wherein the first indication information comprises at least
one of:
cell group identification information;
cell type identification information; or
cell identification information;
and/or,
wherein the processor is further configured to read the
program in the memory to perform:
for a Buffer Status Reporting (BSR) process,
transmitting the BSR by using the same BSR media
access control control element (MAC CE), wherein
second indication information carried by the BSR
MAC CE is configured to distinguish whether the BS
contained in the BSR MAC CE is the BS aiming at the
terrestrial cell or the BS aiming at the non-terrestrial
cell, and the second indication information comprises
any one of a logical channel group identification (LCG
ID) or cell type indication information; and/or
transmitting respectively the BS of the terrestrial cell and
the BS of the non-terrestrial cell by using different BSR
MAC CEs.

12. The communication device according to claim 11,
wherein for a reporting process of preconfigured grant
assistance information, the processor is further configured to
read the program in the memory to perform:
reporting the preconfigured grant assistance information
of the non-terrestrial cell through the terrestrial cell,
wherein the preconfigured grant assistance information
carries third indication information, and the third indi-
cation information is configured to determine that the
assistance information is for the non-terrestrial cell.

13. The communication device according to claim 11,
wherein the processor is further configured to read the
program in the memory to perform:
receiving uplink scheduling information and/or downlink
scheduling information transmitted by the network
device for the non-terrestrial cell, wherein the uplink
scheduling information and/or the downlink scheduling
information are transmitted by the network device
through the terrestrial cell.

* * * * *